(12) United States Patent
Hamilton, II et al.

(10) Patent No.: US 7,979,292 B2
(45) Date of Patent: Jul. 12, 2011

(54) TRAVEL FEE RATE SETTING BASED UPON TRAVEL MODE AND CONVENIENCE

(75) Inventors: Rick A. Hamilton, II, Charlottesville, VA (US); Naveen Lamba, Haymarket, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 12/336,742

(22) Filed: Dec. 17, 2008

(65) Prior Publication Data
US 2010/0153192 A1 Jun. 17, 2010

(51) Int. Cl.
*G06Q 10/00* (2006.01)
*G07B 15/02* (2011.01)

(52) U.S. Cl. .............................. 705/5; 705/13
(58) Field of Classification Search .................. 705/5–6, 705/13, 400
See application file for complete search history.

(56) References Cited

U.S. PATENT DOCUMENTS

| | | | |
|---|---|---|---|
| 5,864,831 A | 1/1999 | Schuessler | |
| 6,696,981 B1 * | 2/2004 | Hashimoto | 340/988 |
| 6,959,282 B2 * | 10/2005 | Kakihara et al. | 705/13 |
| 7,003,398 B2 * | 2/2006 | Seligmann | 701/201 |
| 7,053,792 B2 * | 5/2006 | Aoki et al. | 340/928 |
| 7,127,413 B1 * | 10/2006 | Yanagisawa et al. | 705/13 |
| 7,215,255 B2 | 5/2007 | Grush | |
| 7,398,924 B2 | 7/2008 | Dawson et al. | |
| 2001/0037174 A1 * | 11/2001 | Dickerson | 701/200 |
| 2002/0072963 A1 | 6/2002 | Jonge | |
| 2002/0103769 A1 * | 8/2002 | Smith | 705/400 |
| 2003/0040944 A1 * | 2/2003 | Hileman | 705/5 |
| 2005/0168351 A1 | 8/2005 | Saze et al. | |
| 2005/0246190 A1 * | 11/2005 | Sandor et al. | 705/1 |
| 2007/0100687 A1 | 5/2007 | Yoshikawa | |
| 2008/0021723 A1 * | 1/2008 | Devarakonda | 705/1 |
| 2009/0018902 A1 * | 1/2009 | Miller et al. | 705/13 |
| 2009/0210261 A1 * | 8/2009 | Mortimore, Jr. | 705/5 |

OTHER PUBLICATIONS

Reinhold Priewasser, (1999) "Ecological sustainability and personal behavior: relations demonstrated by the decision-making process of selecting a certain transportation mean", Environmental Management and Health, vol. 10 Iss: 3, pp. 165-169.*

Bjerde et al. (1999) High Level Group on Transport Infrastructure Charging "Final Report on Options for Charging Users Directly for Transport Infrastructure Operating Costs".*

* cited by examiner

*Primary Examiner* — John W Hayes
*Assistant Examiner* — Tonya Joseph
(74) *Attorney, Agent, or Firm* — Patrick J. Daugherty; Driggs, Hogg, Daugherty & Del Zoppo Co., LPA

(57) ABSTRACT

Methods, including service methods, articles of manufacture, systems, articles and programmable devices are provided for charging a travel fee as a function of an ease of access to a travel option. A plurality of travel options is provided and ranked as a function of different environmental-friendliness values. Each of a plurality of different rates are set for each of the travel options, the rates set progressively lower as a function of a ranking of the travel option environmental-friendliness values. In response to a traveler selecting and using one of the travel options, an ease of access of the traveler to the selected travel option is determined and a travel fee charged as a function of the rate set for the selected travel option and the determined ease of access of the traveler to the selected travel option.

15 Claims, 4 Drawing Sheets

TRAVEL FEE RATE SETTING BASED UPON TRAVEL MODE AND CONVENIENCE

FIELD OF THE INVENTION

The present invention generally describes methods, systems and devices for providing travel fees as a function of ease of access to a travel option.

BACKGROUND OF THE INVENTION

The automobile is generally the most common form of daily transportation for travelers or commuters of all kinds. As the number of vehicles on roads continues to grow, traffic congestion and pollution have increased. Management of public thoroughfares comprehends managing use of a variety of travel options, including personal automobile use on public roads, regional and intrastate highways, interstate highways, public toll and access roads, private toll and access roads, as well as various forms of public/mass transportation (e.g., buses, trains, ferries, etc.). Travelers have many differing requirements, options, and habits, each of which impact their decisions on travel option use.

Management of travel issues and options may also contemplate considering the impact of each existing, planned, and proposed transit system on the environment. It is generally desirable to increase the green nature, for example an earth or environmental friendliness, of regional transit systems, and in one aspect considering larger area or national impacts. It is generally considered greener to pursue policies that encourage travelers to maximize their use of mass transportation options in order to minimize their automobile usage. However, transit system management and service provider entities may have difficulty balancing the requirements and desires of commuters and other travelers against transit system requirements and attributes, for example serving traveler needs while also responding to traffic congestion, environmental impact, availability and use of mass transit, and equitable distribution of travel cost issues. Thus, travelers often select travel options based on their personal costs (e.g. time and money), and not in response to overall general efficiency and environmental impact costs, in some examples resulting in choices having a negative environmental impact relative to other options more environmentally favorable.

SUMMARY OF THE INVENTION

Methods are provided for charging a travel fee as a function of an ease of access to a travel option. A plurality of travel options is provided, each of the travel options having a different environmental-friendliness value. The travel options are ranked from highest to lowest as a function of their different environmental-friendliness values. Each of a plurality of different rates are set for each of the travel options, the rates set progressively lower as a function of the highest-to-lowest ranking of the travel option environmental-friendliness values. In response to a traveler selecting and using one of the travel options, an ease of access of the traveler to the selected travel option is determined and a travel fee charged as a function of the rate set for the selected travel option and the determined ease of access of the traveler to the selected travel option.

Service methods are also provided comprising deploying applications for charging a travel fee as a function of an ease of access to a travel option according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for charging a travel fee as a function of an ease of access to a travel option. Moreover, systems, articles and programmable devices are also provided configured for performing one or more method and/or process elements of the current invention for charging a travel fee as a function of an ease of access to a travel option, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

Figure 1:
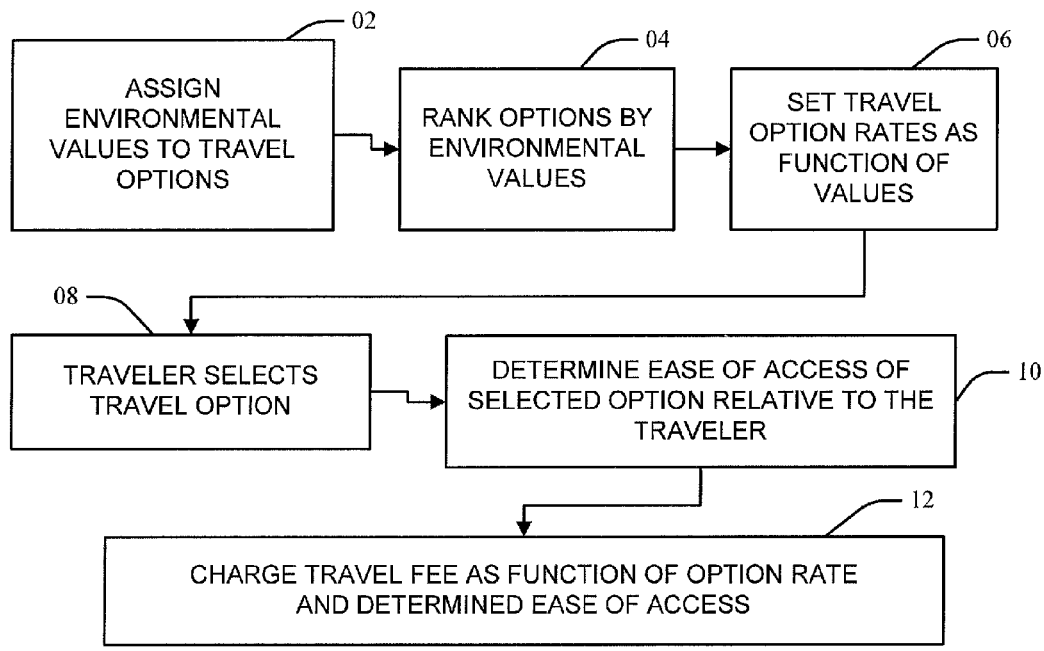
FIG. 1 is a flow chart illustrating a method and system for charging a travel fee as a function of an ease of access to a travel option according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:

I. General Description; and
II. Computerized Implementation.

I. General Description

The present application discloses systems, methods, devices and program products for selecting and applying variable thoroughfare travel fees. Variable travel fees may be determined as a function of traveler or vehicle origin or destination indicia, for example as associated with property types of same and/or proximity to certain resources. In one aspect similar thoroughfare usage by similar travelers or vehicles may result in differentiated rates determined as a function of associated geographic property usage and characteristics. Additionally, as used in the present application, the terms "toll" and "travel fee" refer not only to tolls or other fees associated with specific and designated toll or fee-for-use thoroughfares, but also to any fee or charge, or any credit or benefit, that may be assessed or awarded in association with a thoroughfare by a traveler. For example, a travel fee according to the present invention may comprehend a car-pool credit awarded, or a fee charged or debited from an account) in response to travel on any road, including free-ways and secondary roads, in traveling from an origin point to a destination point, and other examples will be apparent to one skilled in the art.

FIG. 1 illustrates one embodiment of the present invention wherein at 02 a plurality of travel options are provided, each of the travel options having a different environmental-friendliness value. At 04 each of the plurality of travel options are ranked from highest to lowest as a function of their respective different environmental-friendliness values. At 06 each of a plurality of different rates are set for each of the plurality of travel options, the rates set progressively lower as a function of the highest-to-lowest ranking of the environmental-friendliness values of the travel options.

At 08 a traveler selects and uses one the travel options, and at 10 an ease of access of the traveler to the selected travel option is determined. At 12 the traveler is charged a travel fee for use of the selected travel option as a function of the rate set for the selected travel option and the determined ease of access of the traveler to the selected travel option.

Some embodiments of the present invention develop a rate schedule for the ranked travel options and values of ease of access by setting rates progressively lower for relatively higher rankings of the travel options, and setting the rate progressively higher for relatively easier convenience zone ease of access. Thus, rates are lowest for using the most friendly-to-the-environment travel option, and also lowest for association with a relatively lowest ease of access/greatest inconvenience in accessing the most friendly-to-the-environment travel option.

It will be appreciated that travel fees generally comprehend fees for the use of a public mass transportation option (e.g. bus, train, ferry, pedestrian toll bridge access, etc.), tolls for traveler vehicle use of a toll thoroughfare (e.g. a turnpike, canals, bridges, ferries, etc.), and also fees charged (or credits awarded) for use of non-tolled thoroughfares. Thus, fees for travel option uses comprehend fares and tolls for mass transit options and toll thoroughfare as well as fees/credits for use of any thoroughfare for which a toll or credit may be applied: in some examples a car-pool credit may be awarded (or a fee charged or debited) for travel on any road, including free-ways and secondary roads, in traveling from an origin point to a destination point. Global Positioning Satellite (GPS) systems may be used to track traveler or associated vehicle use of a thoroughfare independent of toll road use and associated electronic toll collection (ETC) or fare box systems, thus extending travel determination according to the present invention beyond conventional toll thoroughfares and mass transit options. Travelers and/or their associated vehicles may travel along dedicated transit infrastructures (e.g. railroad tracks), as well as along defined travel options through their regular paths and schedules (e.g. defining a shipping channel or inter-coastal waterway, in some examples with infrastructure or maintenance supported by fees). Additionally, though travel options and toll thoroughfares are most commonly associated with user travel through private vehicles or other conveyance apparatus, they may also be utilized by users travelling under their own power (e.g. by bicycle or wheelchair), and also without any apparatus (by foot as a pedestrian over a toll bridge, or onto a ferry, etc.).

In the implementation and management of thoroughfares, it is advantageous to consider environmental impact issues. For example, thoroughfare management may include a goal of increasing the green nature or earth/environment friendliness of a regional or national transit system network. In one aspect, it is possible to measure the environmental friendliness or total relative impact of a given toll thoroughfare, including determining a "carbon footprint" of use of the thoroughfare. A carbon footprint may be defined as a measure of the impact an activity has on the environment, and in particular with regard to thoroughfares as the amount of greenhouse gases produced in burning fossil fuels for traveler and cargo transportation activities on the thoroughfare. Greenhouse gases are believed to impact the environment through causing climate change, and thus it has become known to quantify the carbon footprint of an activity as the measurement of greenhouse gases produced, typically as an equivalent of carbon dioxide gases generated in units of tons or kilograms.

In one aspect, the present invention enables influencing a commuter's choice of available travel methods by scaling travel fees for each individual commuter based on the environmental friendliness of a travel choice made (e.g. reducing the travel fee costs if more friendly choices are voluntarily selected over less friendly choices, and further encouraging more earth-friendly choice selections by rewarding those commuters who must make a greater effort, or experience more inconvenience, relative to other commuters who have easier access to the same option. In some embodiments charging a travel fee to a traveler (for example at 12 of FIG. 1 discussed above) includes revising a rate set for a selected travel option by lowering or raising the rate as a function of the determined ease of access and charging a travel fee to the traveler as a function of the revised rate.

In some embodiments, determining an ease of access comprehends the establishment, provision and use of convenience zones, the zones defined as a function of different ease of access criteria with respect to travel options. Thus, determining an ease of access of a traveler to a selected travel option may comprise associating the traveler with one of the convenience zones and its criteria value, wherein charging a travel fee to the traveler is a function of the rate of the selected travel option and the criteria value of the associated convenience zone. Association with a given convenience zone may be established through considering the location of trip or commute starting or ending points. In some embodiments a traveler location within a "more-convenient" convenience zone relative to a mass transit option ranked relatively highly on an earth-friendliness scale is expected to use the mass transit option, and thus the traveler may be charged an enhanced fee for use of another travel option if the high-ranked option is not selected, absent some other mitigating factor prohibiting or otherwise making a selection of the high-ranked option difficult or inconvenient. Travelers may also be encouraged to use a higher-ranked option by granting a lower or reduced fee. Associating a traveler with a convenience zone may also comprise analyzing GPS data provided by a device associated with the traveler.

Convenience zones may be established using various ease-of-access criteria and objective values indicative of ease of access. In some examples, a boundary or threshold value is selected and used to demarcate between different convenience zones. Illustrative but not exhaustive examples of ease-of-access values and boundaries include a walk or bicycle-ride time required to reach a mass transit option or destination thereof; a vehicle commuting or drop-off time required to reach the mass transit option or destination thereof; a total travel time of a connecting mass transportation option (e.g. bus, train, etc.) for access to the mass transit or destination thereof; a special option (e.g. car-pool, specialty bus, or a hotel shuttle transportation, etc.) time-to-mass transit or destination thereof value; as a function of a distance value to the selected travel option, each of the convenience zones having a different distance value; and the time or cost values of competing alternative travel and route options available to the commuter or other traveler. Thus, in one example, a first convenience zone with respect to an urban rail system station may be defined by a ten-minute walk time threshold, with locations requiring a longer walk-time up to twenty minutes allocated to a second (less convenient) zone, and locations requiring walk-times of over twenty minutes in reaching the station considered outside of both the first and second convenience zones.

Figure 2:
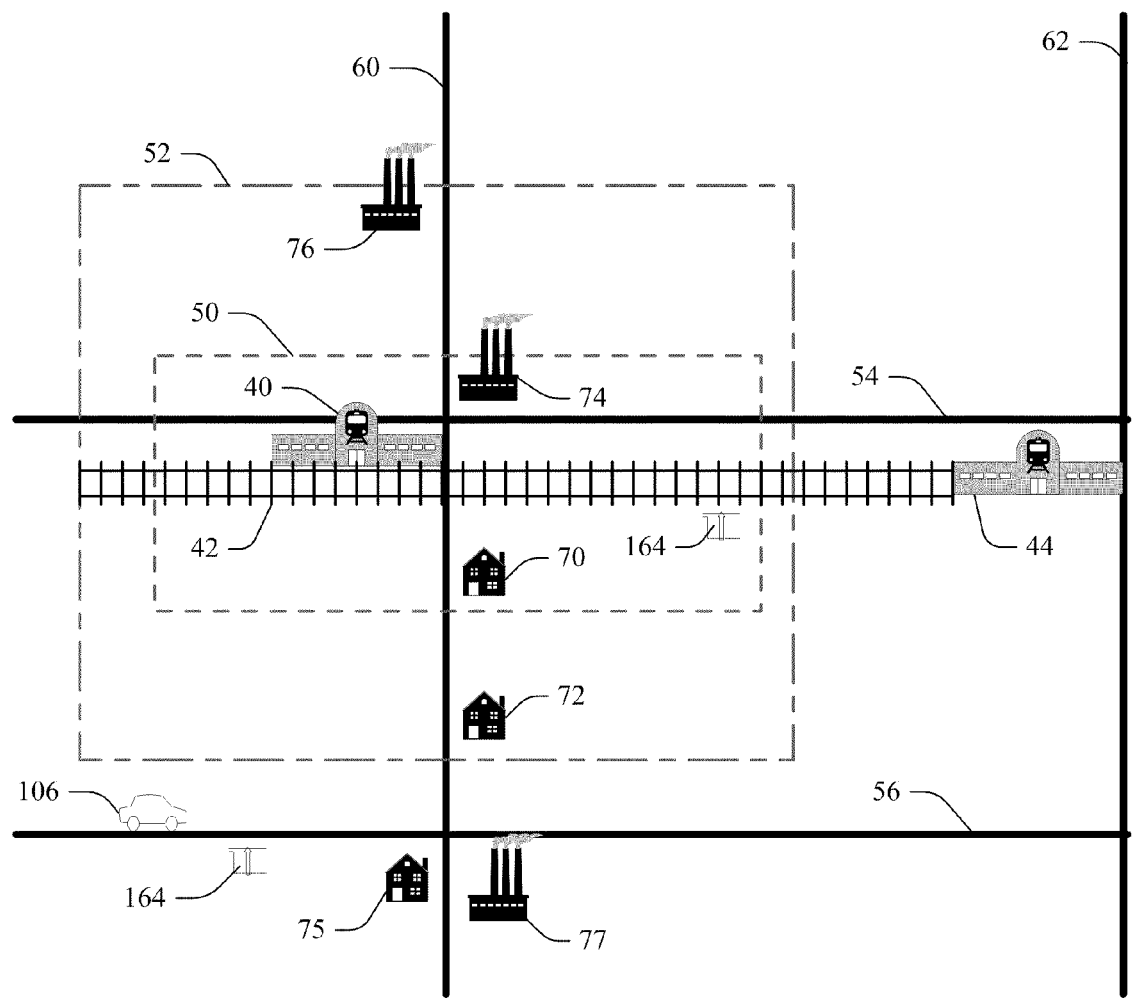
FIG. 2 is diagrammatic illustration of an implementation of a method and system for charging a travel fee as a function of an ease of access to a travel option according to the present invention.

FIG. 2 provides an example of a mapping or other geographic plotting of available travel options, travel routes, services, and associated convenience zones established for charging travel fees according to the present invention. A mass-transportation station 40 (e.g. a train or bus station, stop or other mass transit option ingress or egress access point 40) is provided, enabling commuters and other travelers to access a mass transit option 42 serviced thereby (e.g. a train or bus line 42), which allows a traveler to embark on or debark from the transit option 42 for travel to or return from a destination 44 (or other option, etc.) located a distance from the present station/access point 40. The destination 44 may be another station, waypoint, or connection to another thoroughfare option 62, as well as a residential, entertainment, amenity or employment destination 44, and other examples will be apparent to one skilled in the art.

A first geographic convenience zone 50 is defined, wherein locations or points within the first geographic convenience zone 50 have a common, or no more than a threshold, ease-of-access or convenience-of-access value with respect to the station 40. More particularly, travelers located inside of the first zone 50 have easier/more convenient access to the transit option 42 through the station 40 relative to travelers located outside of the first zone 50. A second convenience zone 52 is also defined with respect to the station 40, wherein travelers from points located inside the second zone 52 still have convenient access to the transit option 42 through the station 40, and more specifically easier access relative to travelers outside of the second zone 52, but wherein their access is less convenient than that of a first zone 50 traveler. For example, a second zone 52 traveler may require supplemental transportation to reach the station 40 (e.g. it is too far to walk to within an acceptable or convenient travel time or required physical effort, but requires a relatively quick bike ride or more convenient bus ride relative to travelers located outside the second zone 52). Also depicted are two toll roadways 54/56 providing fee-based travel options parallel to the mass transit option 42, a proximate toll roadway 54 passing through both the convenience zones 50/52 and a more distant toll roadway 56 outside of the convenience zones 50/52. The toll roads 50/52 are further accessed by secondary roads 60 and 62.

According to the present invention, commuters who have relatively easy access to the mass transit option 42 (for example those inside of the first convenience zone 50) are encouraged to select the mass transit option 42 over the alternative (and perhaps faster) toll roads 54/56 by enhancing the fees they would be charged for using said toll roads 54/56. Furthermore, a fee may also be set, or one of a plurality of scheduled fees selected, as a function of an amount, availability and/or a type of travel mode(s) used to access the station 40 and/or the destination 44. Though each commuter is free to choose to use the toll roads 54/56 rather than the convenient mass transit option 42, those within or associated with the first most-convenient zone 50 may be charged a maximum or enhanced toll fee relative to commuters in/associated with the second zone 52, or those in/associated with areas outside of both zones 50/52, for use of the same toll road 54/56 to reach the same destination 44.

Commuters may also be charged higher fees for selecting relatively less environmentally-friendly means and modes of travel to either reach the station 40 or to travel from within the first convenience zone 50. For example, higher travel fees may be charged for a use of the mass transit option 42 if reaching the station by using a taxicab or other vehicle rather than a more environmentally-friendly bus or a bicycle alternative; in one embodiment use of a transfer ticket from a bus for the mass transit option 42 may result in a lower travel rate or fee for the mass transit option 42 relative to a commuter who parks his vehicle 106 in a parking garage facility at the station 40. Moreover, a commuter in the second zone 52 making a similar alternative travel choice (e.g. a travel mode or vehicle or bus or toll road 54 and secondary road 60/62 combination) as a commuter in the first zone 50 may also be charged an enhanced travel fee or rate relative to a commuter outside of both zones 50/52, but one less than that applied to a first zone 50 commuter.

In another example, a first or second zone 50/52 commuter taking a bus to the station 40 may be charged a lower fee than another first or second zone 50/52 commuter who instead drives to the station 40 as a function of a bus schedule or availability: thus when a bus option is available on a normal or business day schedule, reducing or eliminating application of a relatively enhanced fee during holiday or limited bus scheduling/availability.

In one aspect of the present invention, the carbon footprint of a commuter's transportation mode choice may be considered and travel fees set accordingly, for example in order to provide an incentive to a commuter to minimize or reduce said footprint. Thus, a commuter may be induced to balance his or her travel logistical requirements and desires (e.g. to minimize travel time and inconvenience) with a greater community or regional objective (e.g. reduce traffic on roads 54/56 and secondary roads 60/62 by substituting mass transit option 42 use by commuters, also proportionately minimizing traffic jams and reducing exhaust emissions, etc.) by rewarding a commuter with lower travel fees for voluntarily foregoing a faster automobile travel mode option.

Identification of an association of a commuter or other traveler with or outside of one of the first and second convenience zones 50/52 may be determined through a wide variety of methods and systems. For example, the address of a commuter's residence 70 or of an employment/business property 74 within the first convenience zone 50 may trigger application of first convenience zone 50 travel fees according to the present invention; the address of a residential property 72 or business property 76 within the second convenience zone 52 may instead trigger application of second convenience zone 52 travel fees; and the address of a residential property 75 or a business property 77 outside of both the first and second convenience zones 50/52 triggers application of neither the first nor second convenience zone 50/52 travel fees. Property location indicia may be determined from one or more stored and available data records, databases or sources. Illustrative but not exhaustive examples include real estate records (including property deeds and/or plats records), postal service records, tax authority records, national records such as passport service records, vehicle registration records, tax authority records, and vehicle dealership sales records, and still other appropriate data will be apparent to one skilled in the art. Data obtained and used with respect to the present invention may be stored and retained by a management or service provider entity, and some embodiments may utilize one or more relational databases which may provide advantages in scalability, ease of record association, and ease of data access for view and update.

Figure 3:
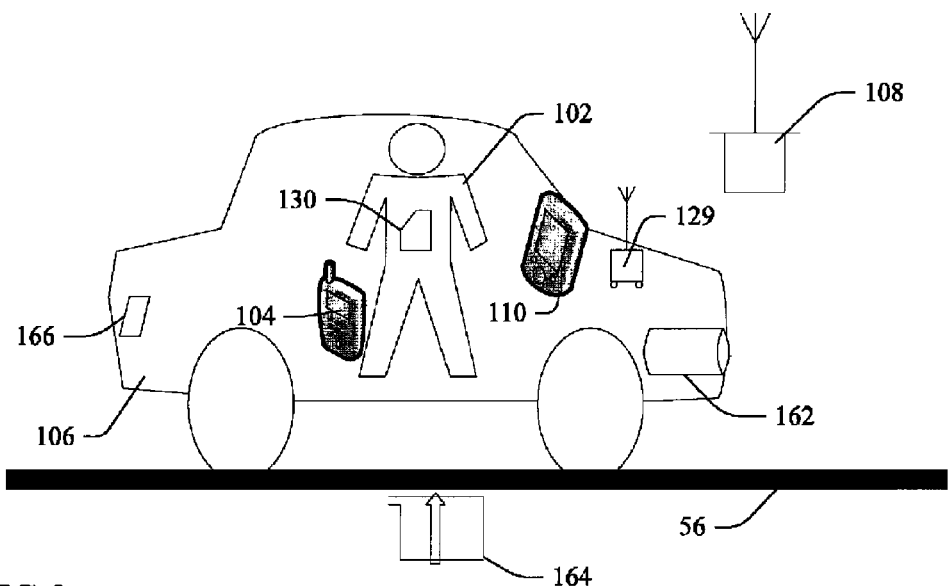
FIG. 3 is a diagrammatic illustration of an implementation of a method and system for charging a travel fee as a function of an ease of access to a travel option according to the present invention.

Convenience zone-based travel fees may be published or otherwise provided in advance to travelers through a variety of means, thus enabling a traveler to balance travel costs with convenient or acceptable trip time or transit modes. Referring now to FIG. 3, according to the present invention, rate schedules may be published to public print media (e.g. newspapers, bulletins) and broadcast media (e.g. television, radio, including conventional or satellite radio systems 129), and may also be pushed directly to travelers, for example through direct mail to addresses within each convenience zone 50 or 52 or outer areas outside of said zones 50/52. Rate schedules may also be sent to a commuter/traveler 102 through internet streaming, internet web pages and direct text or e-mail communications to a personal data device 104 device (e.g. a personal digital assistant (PDA), a personal computer or a cellular telephone), as well as through an automobile 106 data or global positioning satellite system (GPS) system 110, for example, an OnStar® or Garmin® system. (ONSTAR is a trademark of the OnStar Corporation in the United States, other countries, or both; and GARMIN is a trademark of Garmin Ltd. in the United States, other countries, or both.)

Moreover, data associated with mass transit option 42 and/or toll road 54/56 use and convenience zone 50/52 associations may also be exchanged between said data devices 104/110 and a wireless management or service provider hub 108. In one embodiment, data devices 104/110 with GPS functionality provide location data indicating presence within or travel through one of the first or second zones 50/52, enabling responsive convenience zone-based rate setting and travel fee charging. Thus, GPS data provided by the data device 104/110 as associated with the commuter/traveler 102 personally, and/or with a vehicle 106 utilized by the commuter/traveler 102, may establish travel route and mode data including a commute start, a way or ending point, a commute route taken (e.g. mass transit option 42, toll road 54/56 and/or secondary road 60/62); and a commute method or mode used. For example, a vehicle 106 use may be inferred from GPS data indicating traversal of a restricted use toll road 54/56 route; GPS data indicating a mass transit option 42 location/traversal use may indicate a non-vehicle passenger status of the commuter/traveler 102; and GPS data associated with a bike lane portion of secondary road 60 may indicate use of a bicycle to reach the station 40.

Thus, using said GPS data in conjunction with a convenience zone schedule, fee and/or point system according to the present invention enables calculation and assessment of appropriate fees. Travel fees may be collected using an automated electronic toll collection system (ETC), for example incorporating EZ-Pass® and/or SunPass® systems and the like through a vehicle transponder 162 or through physical machine readable media, for example including personal encoded tickets, cards, or tokens 130 carried by the commuter/traveler 102. Such tokens 130 and devices 104/110 may each be configured to communicate with a transponder 164 associated with the toll road 56 or the mass transit option 42, or other wired or wireless data gathering device 164/108. (EZ-PASS is a Trademark of the EZ-Pass Interagency Group in the United States and/or other countries; SUNPASS is a trademark of the Florida Department of Transportation in the United States and/or other countries). ETC systems may also comprehend municipal parking collection systems; vehicle service, fueling or charging stations, for example incorporated into automated fueling pumps or charging stations.

Travel fees may also be assessed and collected through other payment and debiting systems and events, for example upon payment of taxes, renewal of a drivers license, payment of regulated utility bill, and the like; or travel fees may be invoiced for remittance by the vehicle 106 owner or operator or passenger 102 thereof.

Data obtained and used with respect to the present invention may be stored and retained by a management or service provider hub 108. Some embodiments may utilize one or more relational databases, which may provide advantages in scalability, ease of record association, and ease of data access for view and update. Travel route transponders 164 may thus directly scan vehicles 106 and/or commuter/travelers 102 traveling by and acquire data indicative of transit system 42 and toll road 54/56 use from any of the vehicle transponder 162, devices 104/110 or tokens 130, or by scanning a vehicle license plate 166 or other indicia tag 166 (e.g., optically scanning a license plate 166 or using Radio Frequency Identification (RFID) methods and systems to scan an RFID tag 166 comprising unique Vehicle Identification Number (VIN) data or a token 130 for commuter/traveler 102 identification data (e.g. and account number, license or permit number or a social security number).

In one embodiment, application of convenience zone rates may be limited to trips having a minimum or threshold indicia. For example, a trip having a length of less than a predetermined threshold distance of 5 miles may be exempt from triggering application of enhanced travel fees, each commuter/traveler 102 being charged the same travel fee regardless of any association (or lack thereof) with one of the convenience zones 50/52. In another embodiment commuter/travelers 102 outside of the convenience zones 50/52 may receive special discounts for using preferred travel modes or mass transit options 42 within those zones 50/52, in one example charging a travel fee by discounting the rate of a selected highly-ranked option of a plurality of travel options as a function of access from a convenience zone associated with a low-ranked access criteria value.

In some embodiments, fee amounts may be calculated based on each of convenience zone 50/52 association, travel modes selected for said use (for example as determined above with GPS data), and a distance and/or duration of the travel. Calculations may be made on a daily basis, or by individual trip, and in other embodiments said calculations may be made on an aggregate basis (e.g. on a weekly, monthly or other extended time frame basis). Calculations may also be based on a mean or average function, for example providing smoothing based on repeat behavior or on a weekly, monthly or other time frame basis: thus in one embodiment three preferred/high-score transit option 42 trips may be combined/considered with one less preferred/low-environmental score trip on the toll road 54 trip to determine a smoothed or average travel route/mode score to be used in assessing and charging a commuter/traveler 102 a rate fee according to the present invention. In some embodiments, charging a travel fee may comprise aggregating trip data from a plurality of individual trips by a traveler, averaging each of the rates and the associated zone criteria values from each of the individual trips, and charging a travel fee to the traveler as a function of the average of the rates and the average of the criteria values.

Figure 4:
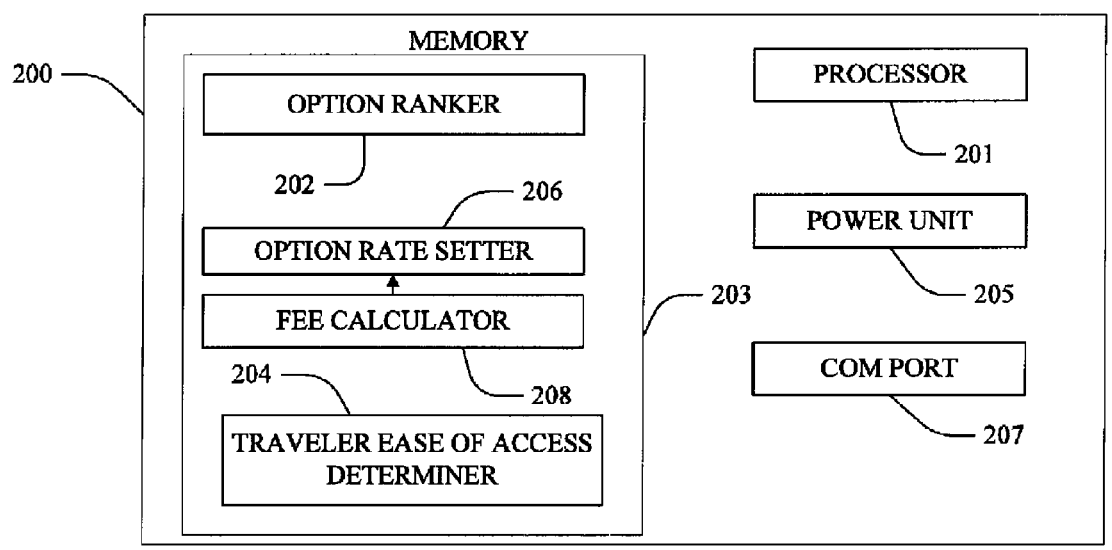
FIG. 4 is a block diagram of a system or device configured to enable charging a travel fee as a function of an ease of access to a travel option according to the present invention.

FIG. 4 illustrates a programmable device or module 200 configured to select and apply toll thoroughfare rates according to the present invention, for example as illustrated in FIGS. 1-3 and described above. The device 200 may be incorporated into a large system wherein other components of the system accomplish systems and methods according to the present invention, or it may be a stand-alone device or module configured to perform each of the systems and methods, such as the transponder device or module 162/164 or devices 104/110 or token 130 of FIG. 3. The present embodiment comprises a central processing unit (CPU) or other processing means 201 in communication with a memory 203, the memory 203 comprising logic components that enable the CPU 201 to perform processes and methods according to the present application, for example as discussed above with respect to FIGS. 1-3. Thus, the memory 203 comprises a travel option ranker logic component 202, the ranker 202 configured to rank each of a plurality of travel options with respect to environmentally-friendly indicia; a traveler convenience determiner logic component 204, configured to determine the ease-of-access of a traveler to a travel option, in some embodiments determining boundaries or other extents of convenience zones as a function of ease of access criteria with respect to an environmentally-friendly travel option; an option rate or fee setter logic component 206, configured to set rates or schedules for use with travel options and optionally with respect to each convenience zone and travel mode; and a fee calculator and responsive charger logic component 208, configured to charge travel fees for use of travel options as a function of travel option rankings, modes, traveler ease of access and/or convenience zone associations.

A power unit 205 is configured to provide operative power to the device 200; examples include battery units 205 and power inputs configured to receive alternating or direct current electrical power, and other appropriate power units 205 will be apparent to one skilled in the art. A communication port or network link/node means 207 is also provided and configured to enable network and other communications with other devices, systems, monitoring, administrative and service provider entities, as well as others as appropriate.

II. Computerized Implementation

Figure 5:
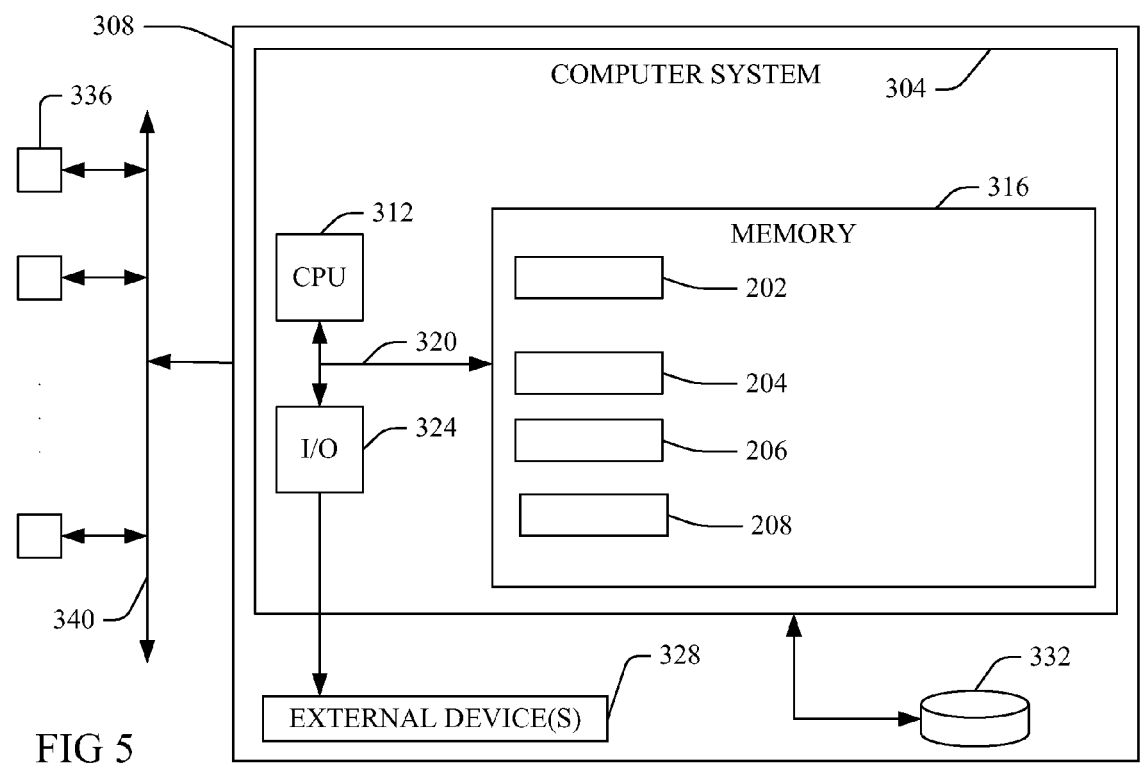
FIG. 5 is a block diagram illustrating a computerized implementation of a method and system for charging a travel fee as a function of an ease of access to a travel option according to the present invention.

Referring now to FIG. 5, an exemplary computerized implementation of the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-4 and described above, including the travel option ranker logic component 202, the traveler convenience determiner logic component 204, the option rate setter logic component 206 and the fee charger logic component 208 discussed above, and which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-4 above and described otherwise herein. To this extent, the computer-readable/useable medium includes program code that implements each of the various process steps of the present application.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for charging a travel fee as a function of an ease of access to a travel option, comprising:
    providing a plurality of travel options, each of the travel options having a different environmental-friendliness value;
    ranking each of the plurality of travel options from highest to lowest as a function of the different environmental-friendliness values;
    setting each of a plurality of different rates for each of the plurality of travel options, the rates set progressively lower as a function of the highest-to-lowest ranking of the environmental-friendliness values of the travel options;
    the traveler selecting and using one of the plurality of travel options;
    determining, via a programmable device, an ease of access of the traveler to the selected one of the travel options; and
    charging, via a programmable device, a travel fee to the traveler for the selected travel option use as a function of the rate set for the selected travel option and the determined ease of access of the traveler to the selected travel option.

2. The method of claim 1, wherein the charging the travel fee to the traveler comprises: revising the rate set for the selected travel option by lowering or raising the rate as a function of the determined ease of access; and
    charging the travel fee to the traveler as a function of the revised rate.

3. The method of claim 1, further comprising: establishing each of a plurality of different convenience zones as a function of a plurality of values of a criteria of an ease of access to the selected travel option, each of the convenience zones having a different criteria value; and
    wherein the determining the ease of access of the traveler to the selected travel option comprises associating the traveler with one of the convenience zones and the criteria value of the associated convenience zone; and
    wherein the charging the travel fee to the traveler is a function of the rate of the selected travel option and the criteria value of the associated convenience zone.

4. The method of claim 3, further comprising defining the ease of access criteria value as at least one of:
    a time for the traveler to walk to the selected travel option;
    a time for the traveler to bicycle to the selected travel option;
    a time for the traveler to travel to the selected travel option by a vehicle; and
    a mass transit conveyance travel time to the selected travel option.

5. The method of claim 4, further comprising associating the traveler with the one convenience zone by identifying within the one convenience zone at least one of:
- a trip origin;
- a trip destination;
- an address associated with the traveler;
- a registration address of a vehicle associated with the selected travel option use;
- an operator address of the vehicle;
- an owner address of the vehicle; and
- a determined GPS positioning of at least one of the vehicle and the traveler.

6. The method of claim 5, further comprising limiting use of the associated convenience zone criteria value in charging the travel fee to the traveler to a traveler trip meeting a minimum threshold trip length.

7. The method of claim 5, wherein the charging the travel fee to the traveler further comprises discounting the rate of a selected highly-ranked option of the plurality of travel options as a function of an access to the selected highly-ranked option by the traveler from a convenience zone associated with a low-ranked access criteria value.

8. The method of claim 5, wherein the associating the traveler with the one convenience zone comprises analyzing GPS data provided by a device associated with the traveler.

9. The method of claim 5, wherein the charging the travel fee further comprises: aggregating trip data from a plurality of individual trips by the traveler; and averaging each of the rates and the associated zone criteria values from each of the individual trips; and charging the travel fee to the traveler as a function of the average of the rates and the average of the criteria values.

10. The method of claim 5, further comprising defining each of the convenience zone criteria values as a function of a distance value to the selected travel option, each of the convenience zones having a different distance value.

11. An article of manufacture for charging a travel fee as a function of an ease of access to a travel option, comprising: a computer readable storage medium device having a computer readable program code embodied thereon, the computer readable program code comprising instructions that, when executed by a computer system, cause the computer system to: rank each of a plurality of travel options from highest to lowest as a function of an environmental-friendliness value of each of the travel options, each of the travel options having a different environmental-friendliness value; set each of a plurality of different rates for each of the plurality of travel options progressively lower as a function of the highest-to-lowest ranking; determine an ease of access of a traveler to one of the travel options selected and used by the traveler; and charge a travel fee to the traveler for the selected travel option use as a function of the rate set for the selected travel option and the determined ease of access of the traveler to the selected travel option.

12. An article of manufacture of claim 11, wherein the program code comprises instructions which, when executed on the computer system, cause the computer system to charge the travel fee to the traveler by: revising the rate set for the selected travel option by lowering or raising the rate as a function of the determined ease of access; and charging the travel fee to the traveler as a function of the revised rate.

13. An article of manufacture of claim 11, wherein the program code comprises instructions which, when executed on the computer system, cause the computer system to: determine the ease of access of the traveler to the selected travel option by associating the traveler with one of a plurality of different convenience zones, each of the convenience zones comprising a different value of a criteria of an ease of access, each of the convenience zones established as a function the criteria values; and charge the travel fee to the traveler as a function of the rate of the selected travel option and the criteria value of the associated convenience zone.

14. A programmable device comprising:
- a processing means;
- a memory in communication with the processing means comprising a logic component; and
- a network interface in communication with the processing means and the memory;
- wherein the processing means:
- rank each of a plurality of travel options from highest to lowest as a function of an environmental-friendliness value of each of the travel options, each of the travel options having a different environmental-friendliness value;
- set each of a plurality of different rates for each of the plurality of travel options progressively lower as a function of the highest-to-lowest ranking;
- determine an ease of access of a traveler to one of the travel options selected and used by the traveler; and
- charge a travel fee to the traveler for the selected travel option use as a function of the rate set for the selected travel option and the determined ease of access of the traveler to the selected travel option.

15. The programmable device of claim 14, wherein the processing means further: determine the ease of access of the traveler to the selected travel option by associating the traveler with one of a plurality of different convenience zones, each of the convenience zones comprising a different value of a criteria of an ease of access, each of the convenience zones established as a function the criteria values; and
charge the travel fee to the traveler as a function of the rate of the selected travel option and the criteria value of the associated convenience zone.

* * * * *